United States Patent [19]

Carissimi

[11] 3,813,640

[45] May 28, 1974

[54] WEATHERPROOF ENCLOSURE FOR ELECTRICAL DEVICES

[75] Inventor: Vincent L. Carissimi, Fairfield, Conn.

[73] Assignee: Harvey Hubbell Incorporated, Bridgeport, Conn.

[22] Filed: May 8, 1972

[21] Appl. No.: 251,418

[52] U.S. Cl. .............................. 339/156 R, 339/170
[51] Int. Cl. ............................................. H01r 13/50
[58] Field of Search ......... 339/7, 8 R, 36, 119, 122, 339/123, 125 R, 147 R, 147 P, 154, 156, 157, 159, 163, 166–168, 170, 10

[56] References Cited
UNITED STATES PATENTS
3,641,472  2/1972  Phillips ............................. 339/10

Primary Examiner—Bobby R. Gay
Assistant Examiner—Lawrence J. Staab
Attorney, Agent, or Firm—Wooster, Davis & Cifelli

[57] ABSTRACT

A weatherproof enclosure for electrical devices such as a receptacle which may be used with vertically or horizontally mounted outlet boxes for maintaining weatherproof protection of the electrical devices in either orientation. The enclosure includes a plate portion for abutting the surface outlet box or the wall in which an outlet box is flush-mounted, and a housing portion connected to the plate which includes a mounting wall in which the enclosed electrical device may be mounted extending at an angle to the axis of the plate. The mounting wall may be recessed within the housing so that the side, top and back walls of the housing form a protective skirt around the electrical device mounted therein.

12 Claims, 4 Drawing Figures

PATENTED MAY 28 1974  3,813,640

WEATHERPROOF ENCLOSURE FOR ELECTRICAL DEVICES

BACKGROUND OF THE INVENTION

This invention relates to enclosures for electrical devices and, more particularly, to an outdoor weatherproof enclosure which may be utilized with either vertically or horizontally disposed outlet boxes and still provide weatherproof protection and ready accessibility to the electrical devices housed therein.

Many residential and commercial buildings include outdoor electrical outlet boxes either flush- or surface-mounted. In addition, many outlet boxes are installed on conduit pipes in garden and walk-way areas for use with lighting fixtures. Usually these outlet boxes contain a receptacle mounted in them, and a spring-biased cover is added to weatherproof the receptacle when it is not in use. If the receptacle is in use, by having an electrically powered device plugged therein, the cover must be open, subjecting the receptacle to the hazards of rain or snow. This is particularly hazardous because typically the receptacle is mounted with its face in a vertical plane which allows water that might impinge on it to run into the receptacle itself.

In addition to this disadvantage of such conventional outlets, it is often times desirable and even required to utilize an electrical protective device in conjunction with the electrically powered device connected to the outlet. For example, the National Electric Code requires that all storable swimming pools using electrical power must be protected by ground fault interrupters. Inasmuch as many such pools are merely connected to an outdoor receptacle, it is desirable to provide a weatherproof enclosure for a ground fault interrupter which may be easily and quickly installed, even by a person having little or no knowledge of electrical wiring. More broadly, it would be desirable to provide a weatherproof enclosure that is easily and quickly installed for converting flush- or surface-mounted outlet boxes to weatherproofed ones.

One of the problems in designing such a weatherproof enclosure is that outdoor outlet boxes may be mounted either horizontally or vertically, thereby necessitating two separate designs for each type of mounting with the attendant increased manufacturing and tooling costs to the manufacturer, and attendant inventory costs and stocking problems to the manufacturer and distributor. Therefore, it would be desirable to provide a weatherproof enclosure for electrical devices which may be used with either vertically or horizontally mounted outlet boxes.

It would also be desirable to provide a weatherproof enclosure having a basic design which is readily adaptable and easily modified to provide two different types of installation. In a first type, the enclosure is electrically connected to the outlet box by merely plugging the enclosure unit into a receptacle in the outlet box. In the second type, the enclosure is electrically connected to the outlet box by means of wires extending from the enclosure. With the first type it will be readily apparent that the enclosure is portable and quickly and easily connected to any receptacle. In those instances where the weatherproof enclosure is utilized for housing an electrical protective device, such as a ground fault interrupter, this portability is particularly desirable so that the electrical protective device may be used at different locations for a variety of purposes. In this regard, it would be desirable to make the enclosure compatible with indoor wall socket plates so that the electrical protective device may be used indoors.

SUMMARY OF THE INVENTION

It is, therefore, an object of the present invention to provide a weatherproof enclosure for housing electrical devices.

It is another object of the present invention to provide a weatherproof enclosure for housing electrical devices which protects the electrical devices against rain and snow when the electrical devices are in use, as well as when they are not in use.

It is still another object of the present invention to provide a weatherproof enclosure for electrical devices which provides adequate protection against rain and snow without the necessity of providing auxiliary means such as lift cover plates.

It is a further object of the present invention to provide a weatherproof enclosure for electrical devices which may be used with either horizontally or vertically mounted outlet boxes without detracting from its weatherproofing properties.

It is a still further object of the present invention to provide a weatherproof enclosure for electrical devices which can be readily and quickly installed to a surface- or flush-mounted outlet box.

It is still another object of the present invention to provide a weatherproof enclosure for electrical devices which is readily adaptable and easily modified to be either plugged into a receptacle in an outlet box, or wired directly to the wires in an outlet box.

It is another object of the present invention to provide an enclosure for electrical devices in which the necessary components such as a receptacle or switch handle are readily accessible without loss of weatherproof protection.

It is a further object of the present invention to provide an enclosure for electrical devices which may be used with conventional indoor wall receptacle and plate installations.

These, as well as other objects and advantages of the present invention, are accomplished by providing a weatherproof enclosure for electrical devices including a plate portion for abutting against a surface box or a surface in which the outlet box is mounted, and a housing portion connected to the plate portion. The housing portion includes a wall for mounting electrical components, such as a receptacle or a toggle switch disposed angularly with respect to the axis of the plate portion.

The component mounting wall may be recessed within the housing to form a protective skirt to shield the accessible components, such as receptacles, test buttons or switch handles, from the weather.

The disposition of the component mounting wall angularly with respect to the axis of the plate portion insures that any rain or snow descending on the top does not reach the component, regardless of whether the enclosure is horizontally or vertically oriented. To this effect, the preferred angular disposition is 45°. With this angle, the component mounting wall remains at 45° to ground level whether the axis of the plate portion is vertical or horizontal, and thus the integrity of the shielding of the components on the component mounting wall is maintained in both horizontally or vertically disposed outlet boxes. In addition, the inclination of the mounting wall causes any water that might splash or otherwise be driven against a component on the mounting wall, to drip off rather than run into the component. Furthermore, if the enclosure is mounted below eye level, the angular disposition of the component mounting wall allows the components to be more readily accessible and observable than if the mounting wall was parallel the the ground level.

The plate portion includes a substantially rectangular flange which is dimensioned so as to surround a conventional wall plate so that the electrical devices enclosed may be used indoors with a conventional indoor wall receptacle and plate without necessitating the removal of the wall plate.

In one embodiment of this invention, a conventional male plug extends from the rear face of the plate portion to engage a conventional female socket. The male plug is positioned in the plate portion so as to cooperate with a conventional receptacle and wall plate combination. This insures that when the enclosure is used outdoors with a receptacle in a flush-mounted outlet box, the plate portion will cover the hole in the building wall so that weatherproofing may be maintained. Alternatively, the enclosure may be more permanently electrically connected to wires in the outlet box by wires extending through the plate portion from the housing, or by termination means such as screws, clamps, etc., as used generally with wiring devices.

A screw extends through the housing and plate portions to cooperate with the plate mounting screw aperture of a conventional receptacle where a conventional male plug is used for connection.

In those instances where wire leads or other wire termination means are used for connection, a dummy strap may be utilized. Alternatively, two screws mounted in a position to engage the threaded mounting ears of the outlet box may be provided.

In order to provide weatherproofing of the plate portion to the outlet box, or the wall around a flush-mounted outlet box, a gasket of any suitable material may be used. If the surface is irregular, caulking compound or other weatherproofing means may be employed.

BRIEF DESCRIPTION OF THE DRAWINGS

These objects and advantages of the present invention will become readily apparent to those skilled in the art from a perusal of the appended claims and the following description when read in conjunction with the attached drawings in which:

DETAILED DESCRIPTION OF THE PREFERRED EMBODIMENT

Figure 3:
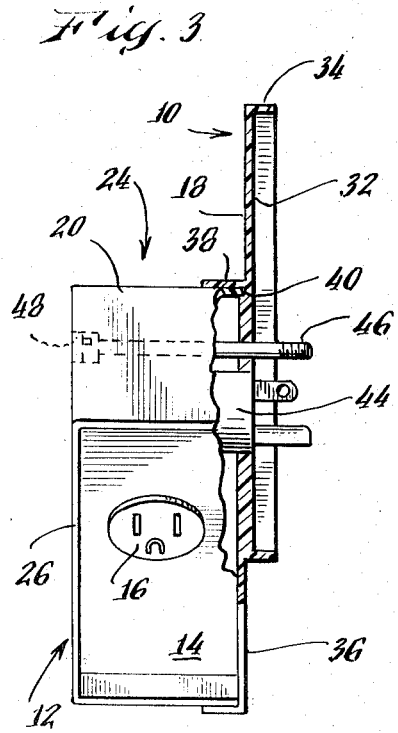
FIG. 3 is a side view thereof partially in section to show its internal structure.

Now, referring to the drawings, the weatherproof enclosure of the present invention includes a plate portion 10 having means for abutting the surface in which an outlet box is mounted and a housing portion 12 for enclosing electrical devices. The housing portion 12 includes a component mounting wall 14 for mounting components such as an electrical receptacle 16 which is accessible for use. The component mounting wall 14 extends away from the front 18 of the plate portion 10 and is disposed at an angle with respect to the axis of the plate portion 10.

The housing portion 12 further includes sides 20 and 22 which also extend angularly with respect to the axis of the plate portion 10, and a top 24 joining the sides 20 and 22. A front 26 extends between the sides 20 and 22, the top 24 and the component mounting wall 14 to complete the housing portion 12. The component mounting wall 14 may be recessed within the housing portion 12 so that the sides 20 and 22, the front 26, and the plate portion 10 which includes means serving as the rear of the housing portion 12 form a protective skirt around the component mounting wall 14 to keep rain and snow away from the receptacle 16.

The top 24 may extend parallel to the component mounting wall 14 or, as is shown in the drawings, may be V-shaped having one leg 28 extending transverse to the axis of the plate portion 10 and the other leg 30 extending parallel thereto.

Figure 1:
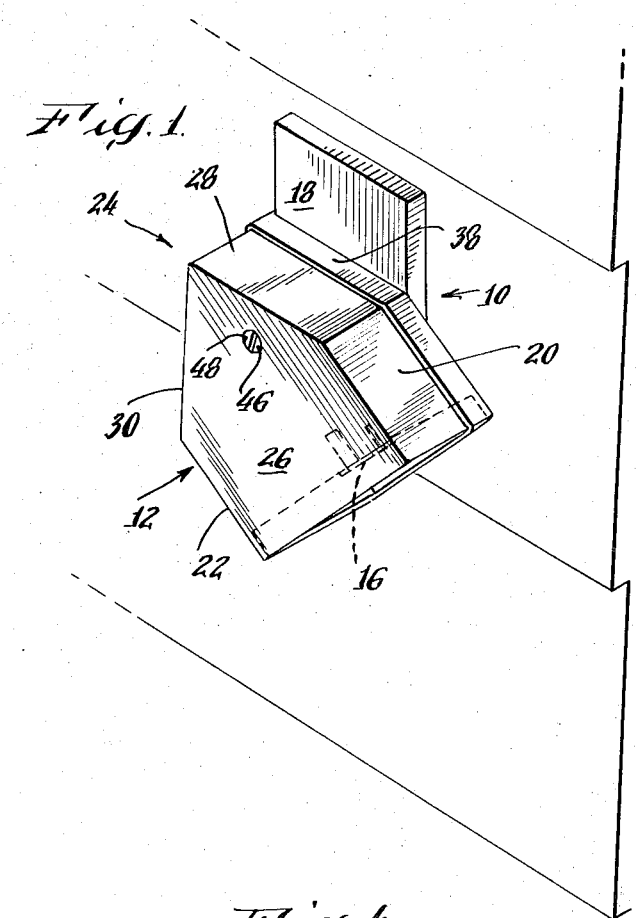
FIG. 1 is a perspective view of a preferred embodiment of the invention disposed in a vertically disposed wall outlet.
Figure 2:
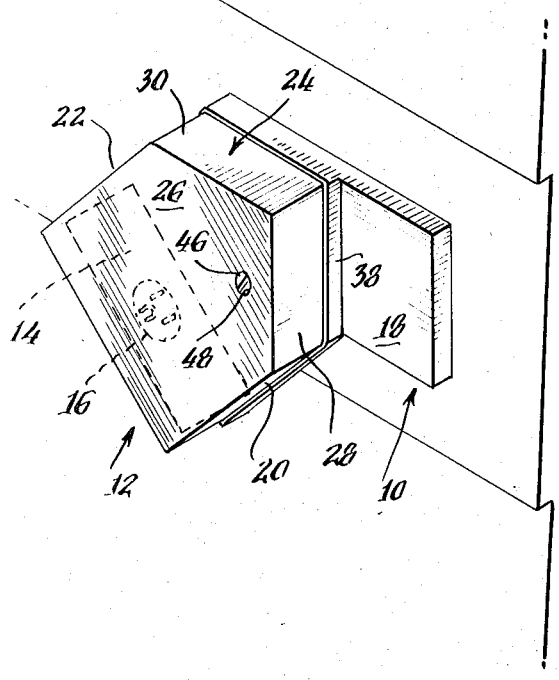
FIG. 2 is a perspective view thereof disposed in a horizontally mounted wall outlet.

As can be seen from FIGS. 1 and 2, the present invention provides against rain and snow for the receptacle 16 for both vertical, as in the case of FIG. 1, and horizontal, as in the case of FIG. 2, disposed outlet boxes. In both instances, the receptacles 16 or other accessible components mounted in the component mounting wall 14 is shielded from any rain or snow entering into the component to cause damage to the electrical device enclosed in the housing portion 12, or even more importantly to cause hazards, such as short circuiting the device.

Figure 4:
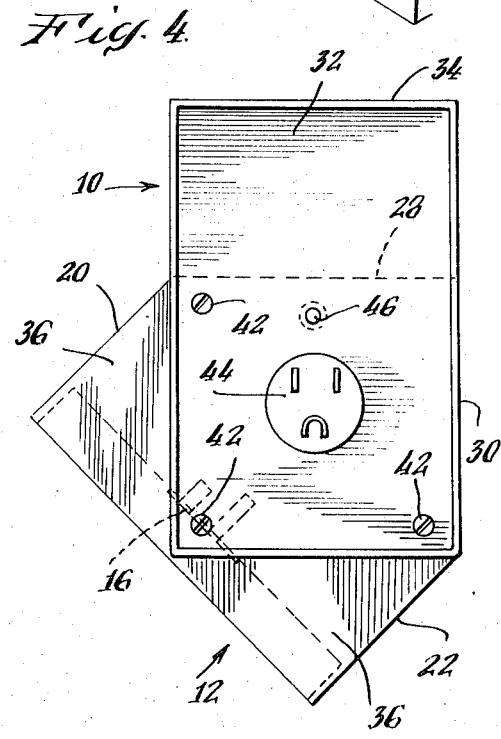
FIG. 4 is a planar view of the back thereof.

Now, referring to FIGS. 3 and 4, the plate portion 10 includes a wall plate like section 32 outlined by a substantially rectangular flange 34 extending from the rear of the section 32 an an integral section 36 extending parallel to the sides 20 and 22 to provide a section complementary to the front 26 of the housing portion 12. The rectangular flange 34 is dimensioned so that it may surround a conventional indoor wall socket plate so that the enclosure may be used indoors when desired.

The front 18 of the plate portion 10 includes a flange 38 adjacent the sides 20 and 22 and the top 24 of the housing 12. The flanges 38 is appropriately designed and dimensioned to conform to the exact shape of the sides 20 and 22 and the top 24 of the housing portion 12 thereby including portions extending along the edges of the integral section 36 transverse across a central part of the plate portion 10 and parallel to one edge of the plate portion 10.

The housing 12 is preferably formed from the combination of the plate portion 10 serving as its rear wall and a removable cover section including the top 24, the sides 20 and 22, the front 26 and the component mounting wall 14 integrally formed. The cover section is mounted to the front 18 of the plate portion 10 with the edges of the top 24, and sides 20 and 22 seated in slots 40 formed in the front 18 of the plate portion 10 adjacent the flange 38; and the component mounting wall 14 seated in a slot formed in the integral section 36 of the plate portion 10. It is secured to the plate by any suitable means, such as screws 42. Alternatively, the receptacle mounting wall top 24 and sides 20 and 22 could be integrally formed with the plate portion 10 with the front 26 being connected thereto and having appropriate flanges to engage the top and sides. Furthermore, any one of the top 24, sides 20 and 22 or component mounting wall 14 could individually be integrally formed with the plate portion 10 with appropriate modifications made in the cover section.

Any electrical device, such as an electrical protective device, may be mounted within the housing portion 12 and connected through the wall plate section 32 of the plate portion 10 by an appropriate electrical connector to render the enclosure easily installed and readily removable for portable use.

In the preferred embodiment, the enclosure is provided with a conventional male plug 44 fixably secured in the plate portion 10 and having the usual male blades for engaging a female socket. The male plug 44 is fixed in the enclosure and, therefore, the orientation of the female socket determines the orientation of the enclosure. With the present invention, the possible variation in the female socket from horizontal to vertical will not inhibit the protection of the receptacle from the weather due to its unique angled disposition. With a 3-blade plug as shown, or other nonsymmetrical plug, it may be necessary in either a horizontally or vertically mounted outlet box to reverse the receptacle position 180° in the outlet box in order that the component mounting wall 14 will be exposed in a downward direction. This may be readily accomplished without disturbing electrical connections by removing the receptacle mounting screws, turning the receptacle 180° and replacing the receptacle in the outlet box.

Alternatively, a permanent installation may be had by providing electrical wires extending through the plate portion 10 for connection to electrical circuit wires in an outlet box. In either arrangement, the enclosure may be secured to the outlet box by a screw 46 received in an aperture 48 which extends through the housing 12 and plate 10. The aperture 48 is positioned on the enclosure to coincide with the usual mounting screw aperture of a wall socket plate so that the screw 46 may be received in the conventional plate mounting aperture of the receptacle of the outlet. Where the enclosure is to be wired directly to the outlet box, a dummy strap may be required for mounting the enclosure to the outlet box. Such a dummy strap would include conventional ears for mounting the strap to the outlet box and a central aperture for receiving the mounting screw 46.

The electrical device housed within the enclosure can be of any type for which a weatherproof enclosure which is easily and quickly installed is desirable. One class of such devices are electrical protective devices, such as ground fault interrupters, which are particularly desirable and in many instances required for connecting the electrical system of storable pools to an electrical cirucit. Inasmuch as use of ground fault interrupters is also desirable for use with many other appliances, the present invention's adaptability to be used with conventional indoor wall sockets, as well as outdoor ones, is particularly advantageous.

The present invention could be modified, if desired, by the addition of a lift cover, either spring loaded or not, to further shield the mounting wall and its electrical components when the device is not in use. Such a lift cover could be designed so as to cover only certain portions of the components of the component mounting wall, or two or more cover plates could be employed for selective covering.

Thus, the present invention provides a weatherproof enclosure for electrical devices which may be used with either vertically or horizontally oriented surface- or flush-mounted outlet boxes, is easily and readily installed, may be easily used with conventional indoor wall sockets, and is readily adaptable and easily modified to provide either portable or permenent electrical connections.

It will be apparent to those skilled in the art that a number of variations and modifications may be made in this invention without departing from its spirit and scope. Accordingly, the foregoing description is to be construed as illustrative only rather than limiting.

What is claimed is:

1. A weatherproof enclosure for an electrical device comprising:
   plate means for abutting a surface, said plate means having major axes along its length and width;
   housing means for enclosing the electrical device, said housing means being connected to said plate means and having a mounting wall to which an electrical power transfer component means is mounted, said mounting wall being oriented perpendicularly relative to said plate means and at substantially equal angles to both major axes thereof; and
   electrical connector means extending through said plate means for connecting said electrical power transfer component means to an electric circuit, said mounting wall being angularly disposed with respect to the direction of gravity when either major axis of said plate means is aligned parallel thereto, said electrical power transfer component means being the only electrical power transfer component means connected to the electrical circuit by said electrical connector means, whereby said electrical power transfer component means is protected from above relative to the direction of gravity by said enclosure.

2. The enclosure of claim 1 wherein said component mounting wall is disposed within said housing means.

3. The enclosure of claim 1 wherein said electrical connector means is a male plug.

4. The enclosure of claim 1 wherein said plate means includes flange means extending therefrom for abutting a surface.

5. The enclosure of claim 4 wherein said flange means is substantially rectangular and is dimensioned to be slightly larger than a wall socket plate.

6. The enclosure of claim 1 wherein said housing means includes sides adjacent said component mounting wall angularly disposed with respect to the axes of said plate means.

7. The enclosure of claim 6 wherein said plate means comprises a back of said housing means and includes a portion extending perpendicularly to said mounting wall and in a parallel direction with said sides.

8. The enclosure of claim 6 wherein said housing means includes a front extending between said sides, said front and said sides extending beyond said component mounting wall to form a protective skirt around said component mounting wall.

9. A weatherproof enclosure for an electrical device comprising:

plate means for abutting a surface, said plate means having major axes along its length and width;

housing means for enclosing the electrical device, said housing means being connected to said plate means and having a mounting wall in which an electrical component may be mounted, said mounting wall being oriented perpendicularly relative to said plate means and at substantially equal angles to both major axes thereof, said housing means including sides adjacent said component mounting wall angularly disposed with respect to the axes of said plate means and a top extending between each end of said sides remote from said component mounting wall; and electrical connector means extending from said plate means for connecting the electrical device to an electric circuit, said mounting wall being angularly disposed with respect to the direction of gravity when either major axis of said plate means is aligned parallel thereto.

10. The enclosure of claim 9 wherein said top is V-shaped with one leg extending substantially transverse to one axis of said plate means and the other leg substantially parallel to the same axis of said plate means.

11. The enclosure of claim 9 wherein said plate means further includes a continuous flange extending therefrom adjacent said sides and top of said housing means.

12. A weatherproof enclosure for an electrical device comprising;

plate means for abutting a surface, said plate means having major axes along its length and width;

housing means for enclosing the electrical device, said housing means being connected to said plate means and having a mounting wall in which an electrical component may be mounted, said mounting wall being oriented perpendicularly relative to said plate means and at substantially equal angles to both major axes thereof, said housing means further including a pair of sides and a top, said sides being disposed adjacent said component mounting wall, said top extending between each end of said sides remotely from said component mounting wall and being V-shaped with one leg traversing said plate means perpendicularly to one major axis and the other leg extending substantially along an edge thereof parallel to the same major axis; and electrical connector means extending from said plate means for connecting the electrical device to an electric circuit, said mounting wall being angularly disposed with respect to the direction of gravity when either major axis of said plate means is aligned parallel thereto.

* * * * *

UNITED STATES PATENT OFFICE
CERTIFICATE OF CORRECTION

Patent No. 3,813,640　　　　　　　Dated May 28, 1974

Inventor(s) Vincent L. Carissimi

It is certified that errors appear in the above-identified patent and that said Letters Patent are hereby corrected as shown below:

Column 3, line 9, "the" (first occurrence) should be --to--. See specification page 4, line 32, as filed.

Column 4, line 25, insert --protection-- after "provides". See specification page 7, line 8, as filed.

Column 4, line 38 "an" (first occurrence) should be --and--. See specification page 7, line 20, as filed.

Column 4, line 47, "flanges" should be --flange--. See specification, page 7, line 27, as filed.

Column 5, line 57, "cirucit" should be --circuit--. See specification page 9, line 30, as filed.

Column 8, (claim 12, line 2), ";" should be -- : --. See Amendment dated November 6, 1973, page 3 (claim 16, line 2).

Signed and sealed this 17th day of September 1974.

(SEAL)
Attest:

McCOY M. GIBSON JR.
Attesting Officer

C. MARSHALL DANN
Commissioner of Patents